(12) United States Patent
Senarath et al.

(10) Patent No.: US 8,576,753 B2
(45) Date of Patent: Nov. 5, 2013

(54) SYSTEM AND METHOD FOR WIRELESS RELAY FRAME STRUCTURE, PROTOCOL, AND OPERATION

(75) Inventors: Nimal Gamini Senarath, Nepean (CA); Israfil Bahceci, Nepean (CA); Mo-Han Fong, Ottawa (CA); Peiying Zhu, Kanata (CA); Derek Yu, Kanata (CA); Hang Zhang, Nepean (CA); Wen Tong, Ottawa (CA); Sheng Sun, Kanata (CA)

(73) Assignee: Apple, Inc., Cupertino, CA (US)

( * ) Notice: Subject to any disclaimer, the term of this patent is extended or adjusted under 35 U.S.C. 154(b) by 340 days.

(21) Appl. No.: 12/937,476

(22) PCT Filed: Apr. 21, 2009

(86) PCT No.: PCT/CA2009/000524
§ 371 (c)(1),
(2), (4) Date: Oct. 12, 2010

(87) PCT Pub. No.: WO2009/129614
PCT Pub. Date: Oct. 29, 2009

(65) Prior Publication Data
US 2011/0038284 A1 Feb. 17, 2011

Related U.S. Application Data

(60) Provisional application No. 61/046,579, filed on Apr. 21, 2008.

(51) Int. Cl.
*H04B 7/14* (2006.01)
(52) U.S. Cl.
USPC .......................................................... 370/279
(58) Field of Classification Search
USPC .......................................... 370/279, 333, 331
See application file for complete search history.

(56) References Cited

U.S. PATENT DOCUMENTS 3,898,390 A * 8/1975 Wells et al. .................... 455/438
6,161,014 A * 12/2000 Girardeau et al. ............ 455/436

(Continued)

FOREIGN PATENT DOCUMENTS

| CN | 1511428 A | 7/2004 |
|----|-----------|--------|
| CN | 101127551 A | 2/2008 |
| WO | 2007019672 A1 | 2/2007 |

OTHER PUBLICATIONS

International Search Report and Written Opinion dated Aug. 6, 2009 for International Application No. PCT/CA2009/000524, International Filing Date Apr. 21, 2009 (14-pages).

(Continued)

*Primary Examiner* — Mark Rinehart
*Assistant Examiner* — Mohammad Anwar
(74) *Attorney, Agent, or Firm* — Meyertons, Hood, Kivlin, Kowert & Goetzel, P.C.; Eric B. Meyertons

(57) ABSTRACT

A relay station is provided for use in a wireless communication system. The wireless communication system includes a plurality of base stations communicatively coupled to a backhaul network and at least one mobile station. The relay station is shared by at least a first base station and a second base station. The relay station includes a transceiver, a controller and relay circuitry. The transceiver transmits signals to and receives signals both base stations and a mobile station. Signals transmitted to the base stations include a single preamble, MAP and FCH. The controller is electrically connected to the transceiver and is operable to measure a signal quality of the mobile station while connected to the first base station. The relay circuitry is electrically connected to the controller and is operable to conduct a phased handoff from the first base station to the second base station based on the signal quality.

20 Claims, 10 Drawing Sheets

(56) References Cited

U.S. PATENT DOCUMENTS

| | | | |
|---|---|---|---|
| 6,853,840 B2* | 2/2005 | Najafi | 455/410 |
| 6,870,811 B2* | 3/2005 | Barker et al. | 370/235 |
| 7,408,898 B1* | 8/2008 | Brown | 370/328 |
| 7,428,428 B2* | 9/2008 | Wong et al. | 455/562.1 |
| 7,457,623 B2* | 11/2008 | Naghian et al. | 455/439 |
| 7,873,002 B2* | 1/2011 | Cai | 370/329 |
| 8,000,648 B2* | 8/2011 | Yoshida et al. | 455/7 |
| 8,140,077 B2 | 3/2012 | Saifullah et al. | |
| 2006/0111113 A1* | 5/2006 | Waris | 455/441 |
| 2007/0058577 A1 | 3/2007 | Rubin | |
| 2007/0133500 A1* | 6/2007 | Rajkotia et al. | 370/348 |
| 2007/0160017 A1 | 7/2007 | Meier et al. | |
| 2007/0211675 A1 | 9/2007 | Jain et al. | |
| 2008/0008159 A1 | 1/2008 | Bourlas et al. | |
| 2008/0031197 A1 | 2/2008 | Wang et al. | |
| 2008/0045145 A1 | 2/2008 | Nakatsugawa | |
| 2008/0045174 A1 | 2/2008 | Chen et al. | |
| 2008/0070582 A1 | 3/2008 | Cai | |
| 2008/0075094 A1 | 3/2008 | Ahn et al. | |
| 2008/0085677 A1* | 4/2008 | Sheen et al. | 455/7 |
| 2008/0165699 A1* | 7/2008 | Wei | 370/252 |
| 2008/0240054 A1* | 10/2008 | Sandhu et al. | 370/338 |
| 2009/0088075 A1* | 4/2009 | Orlassino | 455/41.2 |
| 2009/0109040 A1* | 4/2009 | MacLean et al. | 340/600 |

OTHER PUBLICATIONS

First Office Action and Search Report in Chinese Patent Application No. 200980121340.7, issued Dec. 17, 2012, pp. 1-6.

Office Action and translation thereof in Japanese Patent Application No. 2011-505329, Mar. 7, 2013, pp. 1-8.

* cited by examiner

| Option | | BS-MS | BS-RS1 | RS1-MS | RS1-RS2, when N >2 |
|---|---|---|---|---|---|
| A. Non-16e wireless or wireline R-links | 152 | f1 16e | Wireline or Non-16e | f1 16e | f1 16j |
| B. 16e non-interfering R-link  154 | B1 160 | f1 | g2 (16e) | f1 | g2 (16e) |
| | B2 164 | f1 | f1 | g2 | g2 |
| C. An adjacent Carrier for R-link (no Rx & Tx in the same time)  156 | C1 162 | f1 | f2 | f1 | f2 |
| | C2 166 | f1 | f1 | f2 | f2 |
| D. In-band relay | 158 | f1 | f1 | f1 | f1 |

SYSTEM AND METHOD FOR WIRELESS RELAY FRAME STRUCTURE, PROTOCOL, AND OPERATION

CROSS-REFERENCE TO RELATED APPLICATIONS

This application is a Submission Under 35 U.S.C. §371 for U.S. National Stage Patent Application of International Application Number: PCT/CA2009/000524, filed Apr. 21, 2009 entitled "SYSTEM AND METHOD FOR WIRELESS RELAY FRAME STRUCTURE, PROTOCOL, AND OPERATION," which claims priority to U.S. Provisional Application Ser. No. 61/046,579, filed Apr. 21, 2008, the entirety of both which are incorporated herein by reference.

FIELD OF THE INVENTION

The present invention relates generally to a method and system for wireless communication, and more specifically, to a method and system of wireless relay frame structure, protocol, and operation suitable for 802.16m.

BACKGROUND OF THE INVENTION

Currently, discussions are underway within the Institute of Electrical and Electronics Engineers ("IEEE") to determine a new Advanced Air Interface standard for broadband communication, denoted as 802.16m. One of the issues to be addressed under 802.16m is the use of relay stations ("RS") in wireless communication systems.

Signal quality deterioration, temporary disruptions and even call drop off can happen when a mobile communication device or mobile station ("MS") moves from a cell or area covered by one base station ("BS") to a cell covered by a different BS. When relays are introduced to the system to increase coverage, at the cell edge there is still a need to handover from one BS to another. Handovers may even occur from one RS, i.e. RS1, connected to a first BS, i.e. BS1, to another RS2 connected to BS2. This additional process may cause additional delays increasing the severity of the service interruptions mentioned above. Certain RSs may be shared among multiple BSs, i.e. the RS may be able to communicate with two BSs in the same frame or same time.

Soft handoff and fast cell switching techniques have been proposed for handoffs in the past. However, soft handoffs require additional resources and experience prohibitive inter-BS coordination. Due to these challenges, not even Worldwide Interoperability for Microwave Access ("WiMAX") products designed to operate according to IEEE standard 802.16e have implemented soft handoffs. Additionally, fast cell switching needs extra coordination among BSs. Currently there is no method included in the 802.16 standard to do fast cell switching between two relays because of the complexity involved.

Additionally, no provisions are defined which would allow the use of an RS as an interface translator, such as using 802.16 as a backhaul for providing a connection between any other networks, such as those networks operating under IEEE standards 802.11, 802.15 and 802.16.

Additionally, during disaster situations when a base station is disconnected from the network, there is no way for the BS to quickly, but temporarily, reestablish the essential communications through another BS. The repairs to backhaul can take several days to weeks of service interruption in a disaster situation.

Finally, when multiple carriers are used, the current 802.16j standard has a frame structure that supports communication from the BS to MSs and to the RS at the same time using the same frequency, f1, and from the RS to its MSs and to a second hop RS using a second frequency, f2. However, the reception at the relay from the BS at f1 and the transmission from relay to its MSs and subordinate RSs are at different times per the current frame structure, which effectively doubles the amount of resources required to transmit a message.

Therefore, there is a need for a wireless relay frame structure, protocol and operational functions which address the above deficiencies for use in IEEE standard 802.16m communications.

SUMMARY OF THE INVENTION

The present invention advantageously provides a relay station for use in a cellular communication system. Although described in relation to relay stations, the methods presented in the present invention are capable of being performed by other equipment, systems and apparatuses.

In accordance with one aspect of the present invention, a relay station is provided for use in a wireless communication system. The wireless communication system includes a plurality of base stations communicatively coupled to a backhaul network and at least one mobile station. The relay station is shared by at least a first base station and a second base station. The relay station includes a transceiver, a controller and relay circuitry. The transceiver is operable to transmit wireless signals to and receive wireless signals from the first base station, the second base station, and a mobile station. The wireless signals transmitted to the first base station and the second base include a single preamble, MAP and FCH. The controller is electrically connected to the transceiver. The controller is operable to measure a signal quality of the mobile station which is communicatively connected to the first base station. The relay circuitry is electrically connected to the controller. The relay circuitry is operable to conduct a phased handoff of the mobile station from the first base station to the second base station based on the signal quality.

In accordance with another aspect of the present invention, a relay station is provided for use in a wireless communication system. The wireless communication system includes at least one base station and at least one communication device. The relay station includes at least one transceiver, at least two communication interfaces, an interface translator and relay circuitry. The at least one transceiver is operable to transmit signals to and receive signals from a base station and a communication device. The at least two communication interfaces are electrically connected to the at least one transceiver. Each communication interface implements a different communication protocol stack. The interface translator is electrically connected to the at least two communication interfaces. The interface translator is operable to translate information between the communication interfaces from a first protocol stack associated with a first one of the communication interfaces to a second protocol stack associated with a second one of the communication interfaces. The relay circuitry is electrically connected to the at least one transceiver. The relay circuitry is operable to relay signals between the base station and the communication device.

In accordance with yet another aspect of the present invention, a relay station is provided for use in a wireless communication system. The wireless communication system includes at least one base station, at least one subordinate relay station, and at least one mobile station. The relay station includes relay circuitry and a first transceiver. The relay circuitry is operable to relay wireless signals between the base station and the communication device, and between the base station and the subordinate relay station. The first transceiver is electrically connected to the relay circuitry. The first transceiver is operable to simultaneously receive a first wireless signal from the base station using a first frequency and transmit a second wireless signal to the subordinate relay station using a second frequency.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
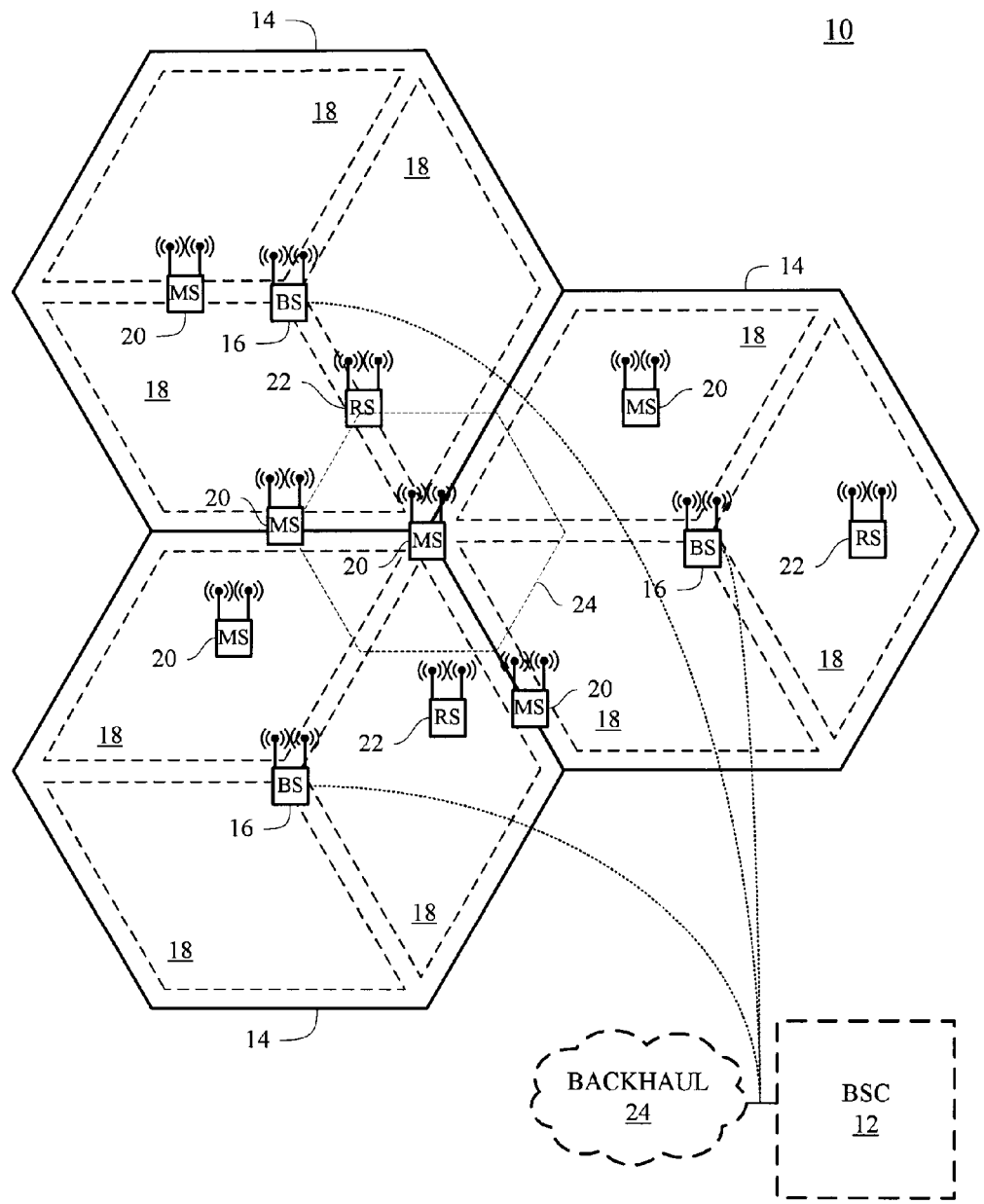
FIG. 1 is a block diagram of an exemplary cellular communication system constructed in accordance with the principles of the present invention.

Before describing in detail exemplary embodiments that are in accordance with the present invention, it is noted that the embodiments reside primarily in combinations of apparatus components and processing steps related to improving the overall system performance and spectral efficiency of a communication system using link adaptation schemes. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements, there is shown in FIG. 1, an exemplary communication system 10 is provided in accordance with the principles of the present invention. Communication system 10 includes a base station controller ("BSC") 12 which controls wireless communications within multiple cells 14, which cells are served by corresponding base stations ("BS") 16. In some configurations, each cell is further divided into multiple sectors 18 or zones (not shown). In general, each base station 16 facilitates communications using orthogonal frequency division multiplexing ("OFDM") with mobile and/or wireless terminals 20, which are within the cell 14 associated with the corresponding base station 16. The movement of the mobile terminals 20 in relation to the base stations 16 results in significant fluctuation in channel conditions. As illustrated, the base stations 16 and mobile terminals 20 may include multiple antennas to provide spatial diversity for communications. In some configurations, relay stations 22 may assist in communications between base stations 16 and wireless terminals 20. Wireless terminals 20 can be handed off from any cell 14, sector 18, zone (not shown), base station 16 or relay 22 to another cell 14, sector 18, zone (not shown), base station 16 or relay 22. In some configurations, base stations 16 communicate with each other and with another network (such as a core network or the internet, both not shown) over a backhaul network 24. In some configurations, a base station controller 12 is not needed.

Figure 2:
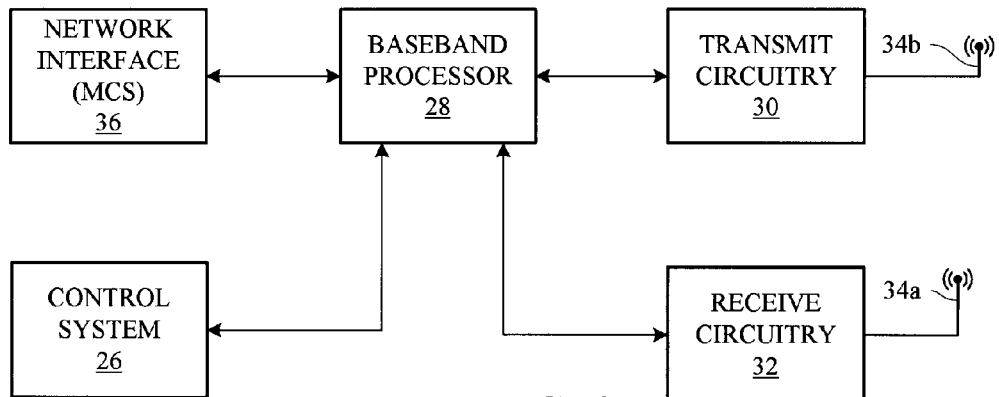
FIG. 2 is a block diagram of an exemplary base station constructed in accordance with the principles of the present invention.

With reference to FIG. 2, an example of a base station 16 is illustrated. The base station 16 generally includes a control system 26, a baseband processor 28, transmit circuitry 30, receive circuitry 32, multiple antennas 34a, 34b and a network interface 36. Control system 26 may be a central processing unit ("CPU") or other controller or microprocessor. The receive circuitry 32 receives radio frequency signals bearing information through a receive antenna 34a from one or more remote transmitters provided by mobile terminals 20 (illustrated in FIG. 3) and relay stations 22 (illustrated in FIG. 4). Although shown in FIG. 2 with only one receive antenna 34a and one transmit antenna 34b, the number of receive antennas 34a and transmit antennas 34b can be more than one. Also, the transmit antennas 34b can be the same antennas 34a used for receiving. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 28 processes the digitized received signal to extract the information or data bits conveyed in the received signal. This processing typically comprises demodulation, decoding, and error correction operations. As such, the baseband processor 28 is generally implemented in one or more digital signal processors ("DSPs") and/or application-specific integrated circuits ("ASICs"). The received information is sent across a wireless network via the network interface 36 or transmitted to another mobile terminal 20 serviced by the base station 16, either directly or with the assistance of a relay 22.

On the transmit side, the baseband processor 28 receives digitized data, which may represent voice, data, or control information, from the network interface 36 under the control of control system 26, and encodes the data for transmission. The encoded data is output to the transmit circuitry 30, where it is modulated by one or more carrier signals having a desired transmit frequency or frequencies. A power amplifier (not shown) amplifies the modulated carrier signals to a level appropriate for transmission, and delivers the modulated carrier signals to the transmit antennas 34b through a matching network (not shown). Modulation and processing details are described in greater detail below.

Figure 3:
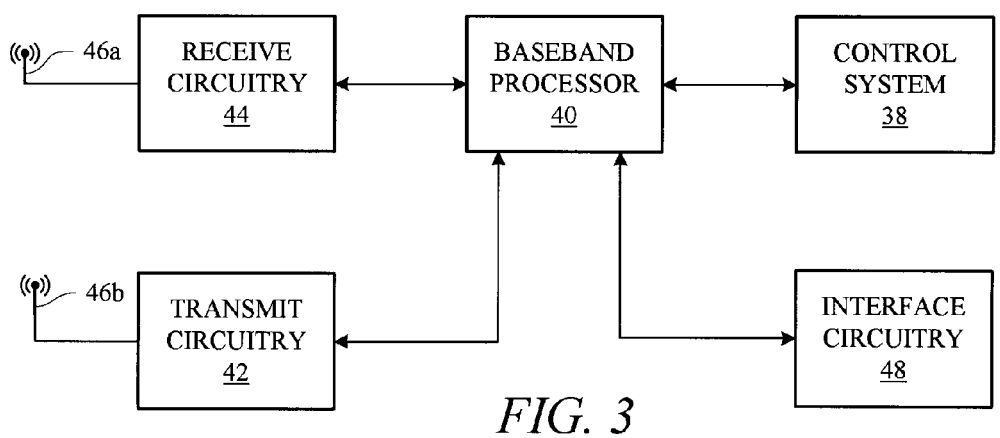
FIG. 3 is a block diagram of an exemplary wireless terminal constructed in accordance with the principles of the present invention.

With reference to FIG. 3, an example of a mobile terminal 20 is illustrated. Similarly to the base station 16, the mobile terminal 20 includes a control system 38, a baseband processor 40, transmit circuitry 42, receive circuitry 44, multiple antennas 46a, 46b and user interface circuitry 48. Control system 38 may be a CPU or other controller or microprocessor. The receive circuitry 44 receives radio frequency signals bearing information through a receive antenna 46a from one or more base stations 16 and relays 22. Although shown in FIG. 3 with only one receive antenna 46a and one transmit antenna 46b, the number of receive antennas 46a and transmit antennas 46b can be more than one. Also, the transmit antennas 46b can be the same antennas 46a used for receiving. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 40 processes the digitized received signal to extract the information or data bits conveyed in the received signal. This processing typically comprises demodulation, decoding, and error correction operations. The baseband processor 40 is generally implemented in one or more DSPs and/or ASICs.

For transmission, the baseband processor 40 receives digitized data, which may represent voice, video, data, or control information, from the control system 38, which it encodes for transmission. The encoded data is output to the transmit circuitry 42, where it is used by a modulator to modulate one or more carrier signals at a desired transmit frequency or frequencies. A power amplifier (not shown) amplifies the modulated carrier signals to a level appropriate for transmission, and delivers the modulated carrier signal to the transmit antennas 46b through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform ("IFFT") on the information to be transmitted. For demodulation, the performance of a Fast Fourier Transform ("FFT") on the received signal recovers the transmitted information. In practice, the IFFT and FFT are provided by digital signal processing carrying out an Inverse Discrete Fourier Transform ("IDFT") and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 16 to the mobile terminals 20. Each base station 16 is equipped with "n" transmit antennas 34b (n>=1), and each mobile terminal 20 is equipped with "m" receive antennas 46a (m>=1). Notably, the respective antennas can be used for reception and transmission using appropriate duplexers or switches and are so labeled only for clarity.

When relay stations 22 are used, OFDM is preferably used for downlink transmission from the base stations 16 to the relays 22 and from relay stations 22 to the mobile terminals 20.

Figure 4:
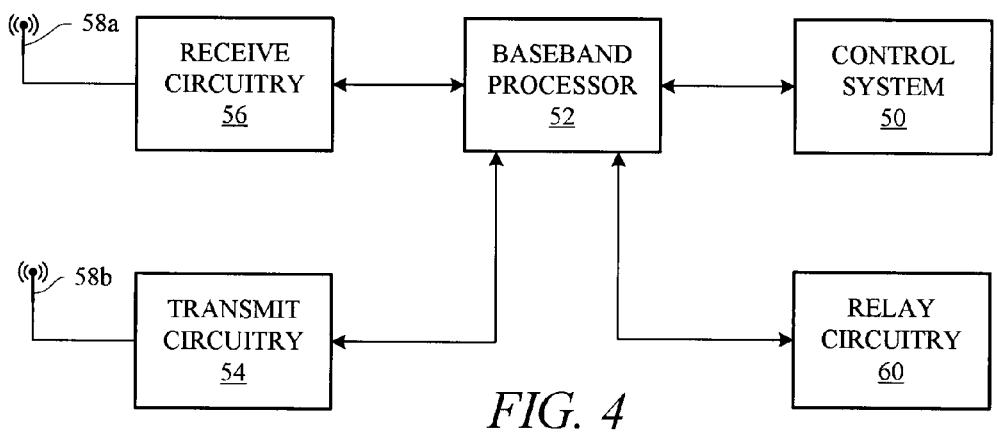
FIG. 4 is a block diagram of an exemplary relay station constructed in accordance with the principles of the present invention.

With reference to FIG. 4, an example of a relay station 22 is illustrated. Similarly to the base station 16, and the mobile terminal 20, the relay station 22 includes a control system 50, a baseband processor 52, transmit circuitry 54, receive circuitry 56, multiple antennas 58a, 58b and relay circuitry 60. Control system 50 may be a CPU or other controller or microprocessor. The relay circuitry 60 enables the relay 22 to assist in communications between a base station 16 and mobile terminals 20. The receive circuitry 56 receives radio frequency signals bearing information through a receive antenna 58a from one or more base stations 16 and mobile terminals 20. Although shown in FIG. 4 with only one receive antenna 58a and one transmit antenna 58b, the number of receive antennas 58a and transmit antennas 58b can be more than one. Also, the transmit antennas 58b can be the same antennas 58a used for receiving. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 52 processes the digitized received signal to extract the information or data bits conveyed in the received signal. This processing typically comprises demodulation, decoding, and error correction operations. The baseband processor 52 is generally implemented in one or more DSPs and/or ASICs.

For transmission, the baseband processor 52 receives digitized data, which may represent voice, video, data, or control information, from the control system 50, which it encodes for transmission. The encoded data is output to the transmit circuitry 54, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the transmit antenna 58*b* through a matching network (not shown). Various modulation and processing techniques available to those skilled in the art are used for signal transmission between the mobile terminal 20 and the base station 16, either directly or indirectly via a relay station 22, as described above.

Figure 5:
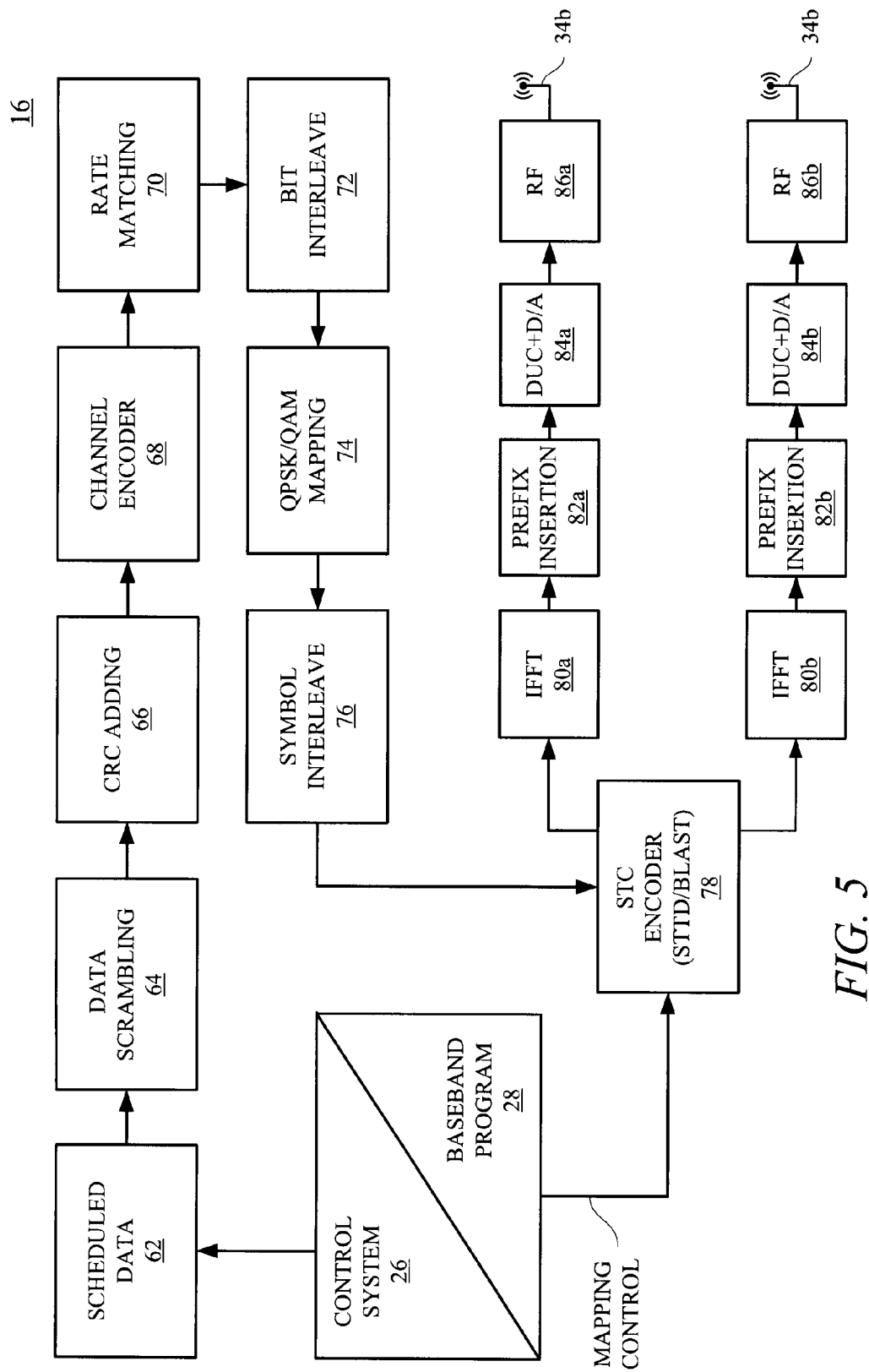
FIG. 5 is a block diagram of a logical breakdown of an exemplary OFDM transmitter architecture constructed in accordance with the principles of the present invention.

With reference to FIG. 5, a logical OFDM transmission architecture is provided. Initially, the base station controller 12 (See FIG. 1) sends data destined for transmission to various mobile terminals 20 to the base station 16, either directly or with the assistance of a relay station 22. The base station 16 may use channel quality indicators ("CQIs") associated with the mobile terminals 20 to schedule the data for transmission as well as select appropriate coding and modulation for transmitting the scheduled data. The CQIs may be directly from the mobile terminals 20 or determined at the base station 16 based on information provided by the mobile terminals 20. In either case, the CQI for each mobile terminal 20 is a function of the degree to which the channel amplitude (or response) varies across the OFDM frequency band.

Scheduled data 62, which is a stream of bits, is scrambled in a manner reducing the peak-to-average power ratio associated with the data using data scrambling logic 64. A cyclic redundancy check ("CRC") for the scrambled data is determined and appended to the scrambled data using CRC adding logic 66. Channel coding is performed using channel encoder logic 68 to effectively add redundancy to the data to facilitate recovery and error correction at the mobile terminal 20. Again, the channel coding for a particular mobile terminal 20 is based on the CQI. In some implementations, the channel encoder logic 68 uses known Turbo encoding techniques. The encoded data is processed by rate matching logic 70 to compensate for the data expansion associated with encoding.

Bit interleaver logic 72 systematically reorders the bits in the encoded data to minimize the loss of consecutive data bits. The resultant data bits are systematically mapped into corresponding symbols depending on the chosen baseband modulation by mapping logic 74. Preferably, Quadrature Amplitude Modulation ("QAM") or Quadrature Phase Shift Key ("QPSK") modulation is used. The degree of modulation is preferably chosen based on the CQI for the particular mobile terminal 20. The symbols may be systematically reordered to further bolster the immunity of the transmitted signal to periodic data loss caused by frequency selective fading using symbol interleaver logic 76.

At this point, groups of bits have been mapped into symbols representing locations in an amplitude and phase constellation. When spatial diversity is desired, blocks of symbols are then processed by space-time block code ("STC") encoder logic 78, which modifies the symbols in a fashion making the transmitted signals more resistant to interference and more readily decoded at a mobile terminal 20. The STC encoder logic 78 processes the incoming symbols and provide "n" outputs corresponding to the number of transmit antennas 34*b* for the base station 16. The control system 26 and/or baseband processor 28, as described above with respect to FIG. 2, provides a mapping control signal to control STC encoding. At this point, assume the symbols for the "n" outputs are representative of the data to be transmitted and capable of being recovered by the mobile terminal 20.

For the present example, assume the base station 16 has two transmit antennas 32*b* (n=2) and the STC encoder logic 78 provides two output streams of symbols. Accordingly, each of the symbol streams output by the STC encoder logic 78 is sent to a corresponding IFFT processor 80*a*, 80*b* (referred to collectively herein as IFFT 80), illustrated separately for ease of understanding. Those skilled in the art will recognize that one or more processors may be used to provide such digital signal processing, alone or in combination with other processing described herein. The IFFT processors 80 preferably operate on the respective symbols to provide an inverse Fourier Transform. The output of the IFFT processors 80 provides symbols in the time domain. The time domain symbols are grouped into frames, which are associated with a prefix-by-prefix insertion logic 82*a*, 82*b* (referred to collectively herein as prefix insertion 82). Each of the resultant signals is up-converted in the digital domain to an intermediate frequency and converted to an analog signal via the corresponding digital up-conversion ("DUC") and digital-to-analog ("D/A") conversion circuitry 84*a*, 84*b* (referred to collectively herein as DUC+D/A 84). The resultant (analog) signals are simultaneously modulated at the desired RF frequency, amplified, and transmitted via the RF circuitry 86*a*, 86*b* (referred to collectively herein as RF circuitry 86) and antennas 34*b*. Notably, pilot signals known by the intended mobile terminal 16 are scattered among the sub-carriers. The mobile terminal 16, which is discussed in detail below, uses the pilot signals for channel estimation.

Figure 6:
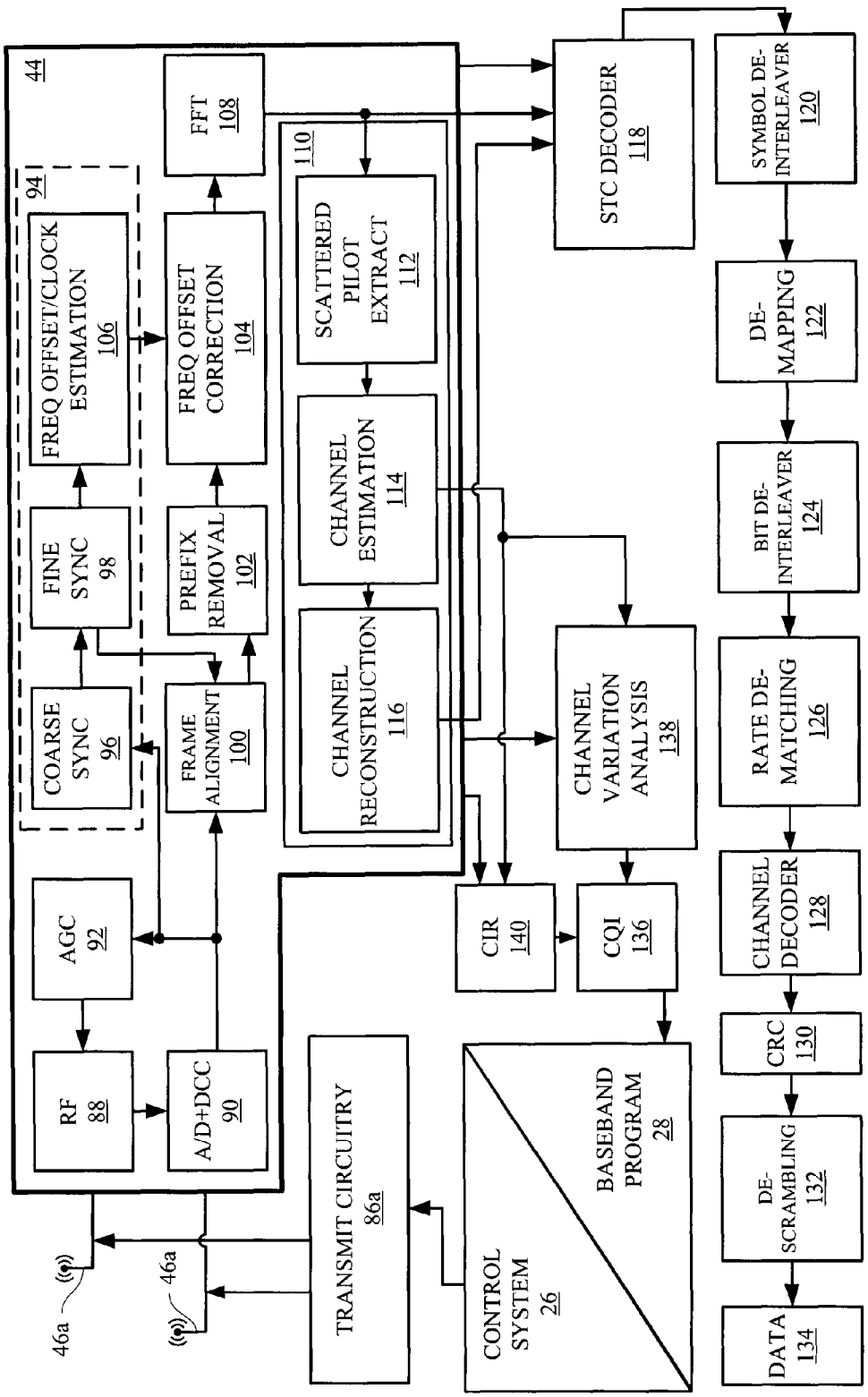
FIG. 6 is a block diagram of a logical breakdown of an exemplary OFDM receiver architecture constructed in accordance with the principles of the present invention.

Reference is now made to FIG. 6 to illustrate reception of the transmitted signals by a mobile terminal 20, either directly from base station 16 or with the assistance of relay 22. Upon arrival of the transmitted signals at each of the antennas 46*a* of the mobile terminal 20, the respective signals are demodulated and amplified by corresponding RF circuitry 88. For the sake of conciseness and clarity, only one of the two receive paths is described and illustrated in detail. Analog-to-digital (A/D) converter and down-conversion circuitry 90 digitizes and down-converts the analog signal for digital processing. The resultant digitized signal may be used by automatic gain control circuitry (AGC) 92 to control the gain of the amplifiers in the RF circuitry 88 based on the received signal level.

Initially, the digitized signal is provided to synchronization logic 94, which includes coarse synchronization logic 96, which buffers several OFDM symbols and calculates an auto-correlation between the two successive OFDM symbols. A resultant time index corresponding to the maximum of the correlation result determines a fine synchronization search window, which is used by fine synchronization logic 98 to determine a precise framing starting position based on the headers. The output of the fine synchronization logic 98 facilitates frame acquisition by frame alignment logic 100. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 102 and resultant samples are sent to frequency offset correction logic 104, which compensates for the system frequency offset caused by the unmatched local oscillators in the transmitter and the receiver. Preferably, the synchronization logic 94 includes frequency offset and clock estimation logic 106, which is based on the headers to help estimate such effects on the transmitted signal and provide those estimations to the correction logic 104 to properly process OFDM symbols.

At this point, the OFDM symbols in the time domain are ready for conversion to the frequency domain using FFT processing logic 108. The results are frequency domain symbols, which are sent to processing logic 110. The processing logic 110 extracts the scattered pilot signal using scattered pilot extraction logic 112, determines a channel estimate based on the extracted pilot signal using channel estimation logic 114, and provides channel responses for all sub-carriers using channel reconstruction logic 116. In order to determine a channel response for each of the sub-carriers, the pilot signal is essentially multiple pilot symbols that are scattered among the data symbols throughout the OFDM sub-carriers in a known pattern in both time and frequency.

Continuing with FIG. 6, the processing logic 110 compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 118, which provides STC decoding on both received paths to recover the transmitted symbols. The channel reconstruction information provides equalization information to the STC decoder 118 sufficient to remove the effects of the transmission channel when processing the respective frequency domain symbols.

The recovered symbols are placed back in order using symbol de-interleaver logic 120, which corresponds to the symbol interleaver logic 76 of the base station 16 transmitter. The de-interleaved symbols are then demodulated or de-mapped to a corresponding bitstream using de-mapping logic 122. The bits are then de-interleaved using bit de-interleaver logic 124, which corresponds to the bit interleaver logic 72 of the base station 16 transmitter architecture. The de-interleaved bits are then processed by rate de-matching logic 126 and presented to channel decoder logic 128 to recover the initially scrambled data and the CRC checksum. Accordingly, CRC logic 130 removes the CRC checksum, checks the scrambled data in traditional fashion, and provides it to the de-scrambling logic 132 for descrambling using the known base station de-scrambling code to recover the originally transmitted data 134.

In parallel to recovering the data 134, a CQI 136, or at least information sufficient to create a CQI at the base station 16, is determined by channel variation analysis logic 138 and transmitted to the base station 16. As noted above, the CQI 136 may be a function of the carrier-to-interference ratio ("CIR") 140, as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Phased Handoff Using a Relay Serving Multiple Base Stations

A shared relay station ("RS") is a relay which can communicate with two or more base stations ("BSs") but transmit a single preamble, media access protocol ("MAP") and frame control header ("FCH"). Two or more co-located and connected RSs transmitting a single preamble, MAP and FCH may also be considered as a shared RS. As per the 802.16j standard, this shared RS acts like two RSs communicating with two BSs. Synchronization is performed using the synchronization signals from one station. Whenever one link fails, any communications via other links will fail as well.

Figure 7:
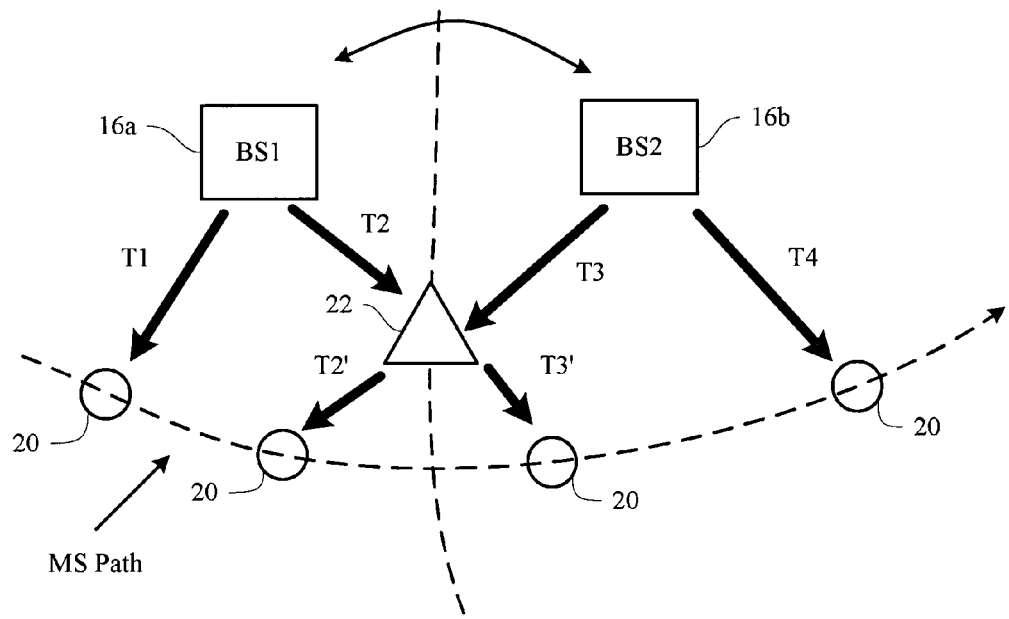
FIG. 7 is a flow diagram illustrating a phased handoff using a relay station serving multiple base stations according to the principles of the present invention.

Referring now to FIG. 7, a relay station ("RS") 22 serving or served to multiple base stations ("BSs") 16a, 16b. Although only two BSs are shown for illustrative purposes, the principles of the present invention may apply equally when an RS 22 is serving any number of BSs 16. The RS 22 should be located in the cell edge or sector edge so that it receives good signals from both BSs 16a, 16b. Mobile stations ("MSs") 20 that can use the RS 22 for communication are served by either BS1 16a or BS2 16b. The selection is done based on the relative signal strength and/or speed of the MS 20.

Figure 8:
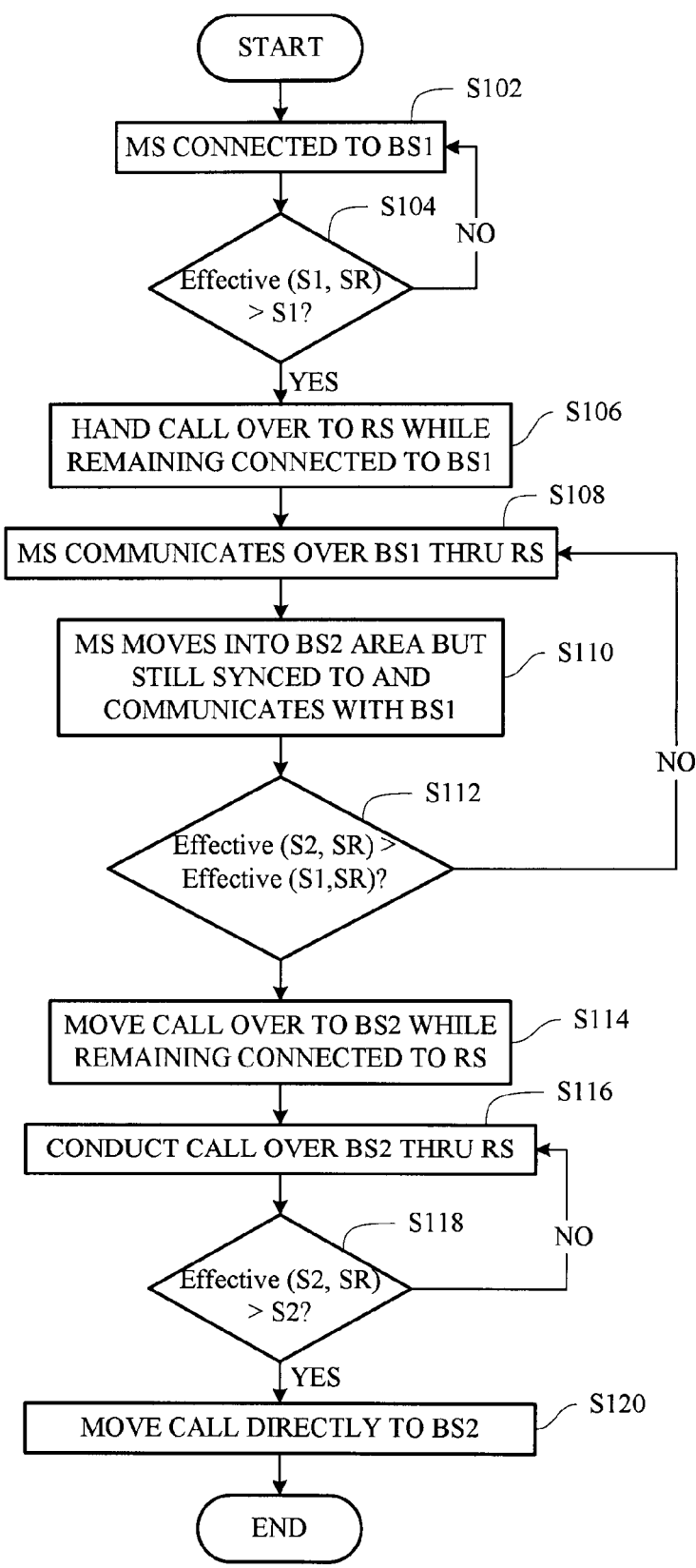
FIG. 8 is a flow chart of an exemplary phased handoff process according to the principles of the present invention.

FIG. 7 illustrates the movement and communication pattern of an MS 20 over time, as determined by the received signal strength. An exemplary operational flowchart is provided in FIG. 8 which describes steps to perform the handoff using relay stations, as shown in FIG. 7. At a first time, T1, the MS 20 is connected directly to BS1 16a (step S102). At T2, the MS 20 has moved into the RS 22 area. Signal strength is measured along the direct MS-BS1 path, as well as the MS-RS-BS1 path. Signal strength ("S") may be estimated as effective signal conditions for different links. S may be based on either uplink ("UL") or downlink ("DL") measurements, such as, but not limited to, carrier/interference ("C/I"), received signal strength ("RSSI"), or interference level. In this example, "S1" denotes the signal level from BS1 16a, "S2" denotes the signal level from BS2 16b, and "SR" denotes the effective signal level from RS 22. Effective signal level from RS 22 is the equivalent signal level considering both BS-RS link and RS-MS link signal levels.

As long as the effective signal strength along the relay path is less than the signal strength along the direct path to BS1, i.e. Effective (S1, SR)<S1+H1 (step S104), the direct MS-BS1 communication is maintained. H1 is a factor used to introduce hysteresis. However, if the effective signal strength along the relay path is greater than the signal strength along the direct path to BS1, i.e. Effective (S1, SR)>S1+H1 (step S104), then communication with the MS 20 is now handed off to RS 22, but the RS 22 maintains communication through the same forwarding node, i.e. BS 16a (step S106), and the MS 20 communicates over BS1 16a through RS 22 (step S108). Therefore, this handoff is an intra-BS handover and can be completed very quickly.

After some time T3, the MS 20 moves to the BS2 16b area while still synced to and connected with BS1 16a thru RS 22 (step S110). It may still be better to serve from RS 22 rather than directly from BS1 16a or BS2 16b. If the effective signal strength of the MS-RS-BS1 connection is greater than the effective signal strength of the MS-RS-BS2 connection (step S112), then the call stays connected to RS 22 and is forwarded to the network through base station BS1 16a. However, if effective signal strength of the MS-RS-BS2 connection is greater than the effective signal strength of the MS-RS-BS1 connection (step S112), the RS 22 requests a partial handover of the MS 20 to BS2 16b, which is transparent to the MS 20 (step S114). The call stays connected to RS 22 and is forwarded to the network through base station BS2 16b (step S116). This handover is performed with some measure of confidence, using a hysteresis to avoid a "ping-pong" effect. RS 22 can have a higher hysteresis margin here because the MS 20 communication is not sacrificed.

Once there is sufficient confidence that the MS 20 has moved into BS2 16b territory and is better served by BS2 16b, an RS 22 to BS2 16b handover can occur at time T4 (step S120). This is also an intra-BS handover and can be performed quickly. Quality is not compromised because the MS 20 is always connected to the RS 22 during the handover period. Therefore, the risky BS-BS handover is done transparent to MS 20 without compromising any signal quality or possibility of dropout of the call. When loading of each BS 16a, 16b is different, these thresholds could be adjusted to reflect the loading or the loading should be weighted in the above evaluations.

Figure 9:
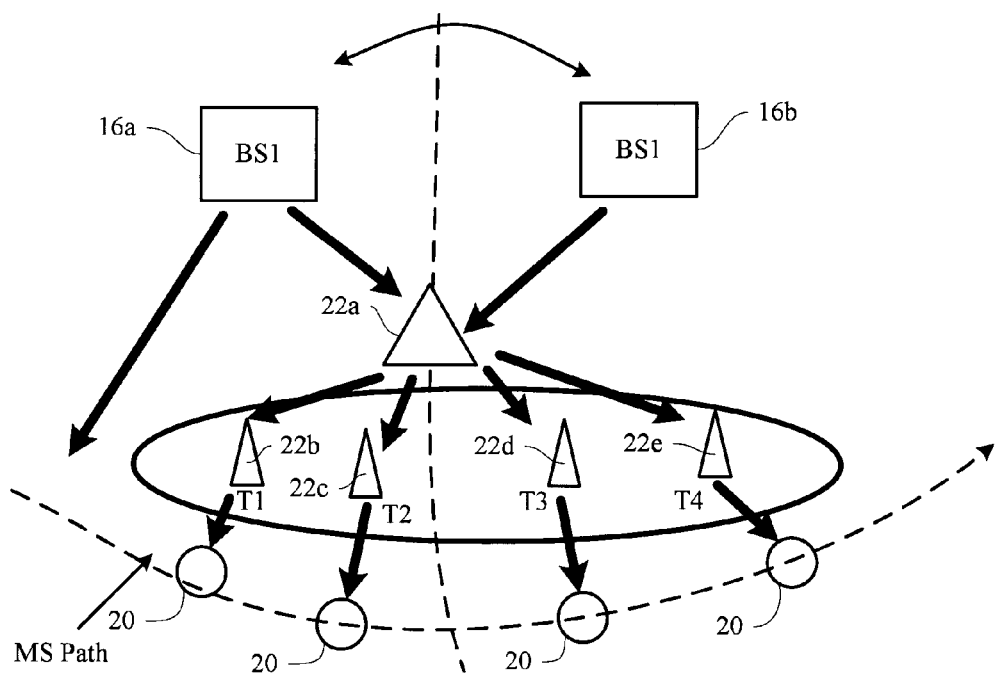
FIG. 9 is a flow diagram illustrating a phased handoff using a group of relay stations serving multiple base stations according to the principles of the present invention.

FIG. 9 illustrates an alternate embodiment includes a shared RS group, where multiple RSs 22a, 22b, 22c, 22d, 22e sharing the same identity are connected to two BSs 16a, 16b. The process is the same as discussed above, but before MS 20 moves to BS2 16b, it may go through several intermediate RSs 22b, 22c, 22d, 22e in the RS group transparent to the MS 20. Alternatively, the RS 22 may be a transparent RS, where MS 20 does not observe a handover even from RS to BS.

Use of Relay Station as Air Interface Translator

An 802.16 relay station 22 may be used as interface translator by implementing more than one interface in the relay station. The relay station 22 can act as aggregator in a wireless network and collect data from one interface and forward them in other interface. A relay station 22 may implement one radio or more than one radio for communication over more than one interface. For a single radio case, time domain multiplexing ("TDM") technology may be implemented by utilize some interface property for time sharing, e.g., 802.11 contention-free timing. Data forwarding between a base station 16 and the relay station 22 is on layer 2 basis, thereby requiring less overhead to implement.

Figure 10:
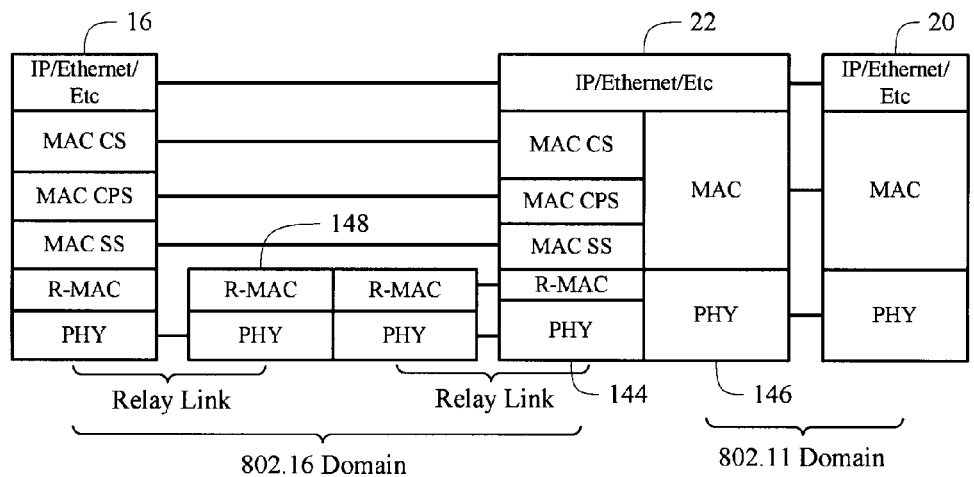
FIG. 10 is a flow diagram of an exemplary interface translator function in a relay station according to the principles of the present invention.

Referring now to FIG. 10, two protocol stacks 144, 146 are defined to enable the RS 22 as an interface translator. The translator RS 22 implements a set of 802.16 protocol 144 to enable communication with an 802.16 family multihop-relay base station ("MR-BS") 16 or RS 22. The translator RS 22 implements another interface 146 to enable communication with equipment, e.g., mobile station, user equipment, etc. implementing the same type interface. For example, in FIG. 10, the second interface 146 uses 802.11. A wireless tunnel or transport connection 148 is established between the 802.16 MR-BS 16 and the translator RS 22. Quality of service ("QoS") info may be extracted by the MS 20 or the translator RS 22 from the upper layer and inserted to either a tunnel packet header or a connection packet header. The routing and QoS control over the wireless tunnel/connection between the BS 16 and the translator RS 22 is purely on layer 2 basis. Upper layer header suppression over the wireless tunnel 148 can be implemented by both BS 16 and the access RS 22 by defining a layer 2 flow ID for each upper layer flow cared by the access RS 22 and the coupling between a flow ID and the suppression rule.

In FIG. 10, the wireless tunnel or transport connection 148 is implemented using Relay Media Access Control ("R-MAC"). The R-MAC protocol is an extension of the point-to-multipoint ("PMP") MAC and defines additional required and optional functionality to the MAC common part sublayer ("MAC CPS") that, when combined with the PMP MAC CPS functionality, provides efficient MAC packet data unit ("MAC PDU") forwarding between an MR-BS 16 and an MS 20 in both directions via one or more RSs 22. The location of the MAC CPS functionality that provides control and data transport to the MS 20 may be distributed between the MR-BS 16 and RS 22 depending on the deployment model that is implemented.

Where the protocol layers on the MR-BS-to-RS and RS-to-RS air interfaces differ from the corresponding layers on the BS-SS air interface due to the incorporation of MR features, these protocol layers are prefixed by an "R". Hence the physical layer on the MR-BS-to-RS and RS-to-RS air interfaces is referred to as R-PHY and the MAC layer on these air interfaces is referred to as R-MAC. Where these layers are identical to the corresponding layers on the SS-to-BS interface and inherit their specifications, these layers may be referred to as PHY and MAC. The terms R-MAC CPS and R-MAC security sublayer are used to denote where MAC sublayers are extended to include MR functionality.

The translator RS 22 can also be used as a wireless gateway, wireless access point ("AP") (802.11) or wireless master (802.15).

Figure 11:
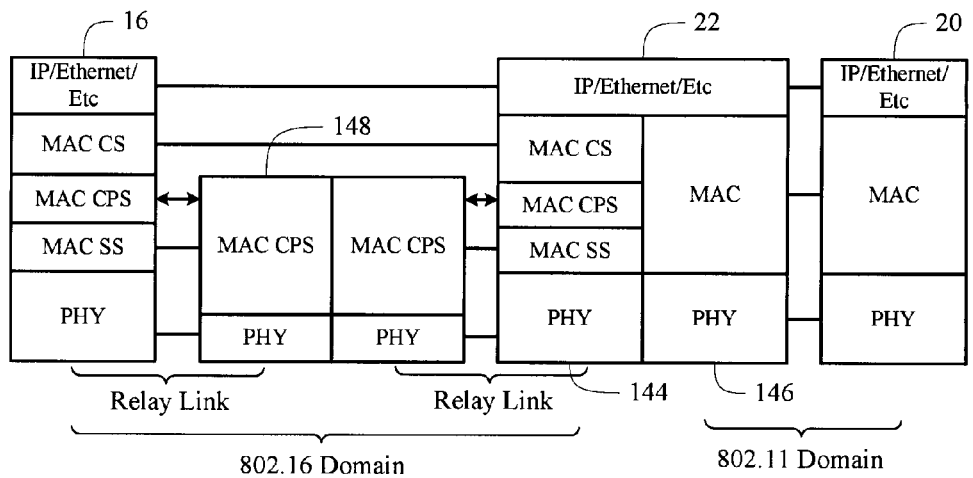
FIG. 11 is a flow diagram of an alternative interface translator function in a relay station according to the principles of the present invention.

FIG. 11 illustrates an alternative embodiment of the present invention that does not use R-MAC in the wireless tunnel or transport connection 148. Generally, MR-BS 16 acts as an IP router or bridge. Incoming upper layer packets are classified into the single wireless transport tunnel/connection 148 of the RS 22. QoS info is extracted from upper layer header, e.g. difserv of IP, and carried on a tunnel/connection packet, along with and tunnel/connection info. Relay stations 22 in the wireless tunnel 148 act as layer 2 router and forward data based on tunnel info and QoS info which are with the tunnel/connection packet header and/or sub-header.

The access RS 22 (translator RS) acts as an IP router in 802.16 domain and as an AP (gateway) in 802.11 domain. The access RS 22 holds two interfaces, an 802.16 interface 144 and an 802.11 interface 146. All packets destined for the internet are collected from the 802.11 domain, and mapped on to the access RS 22 tunnel/connection 148. QoS info are extracted from the upper layer and carried in a tunnel/connection packet header. All the packets received from BS 16 are forwarded to MSs 20 or other computer stations ("STAs").

Base Station Connection to Other BSs Through an RS for Synchronization and Disaster/Emergency Situations In normal operation, all base stations 16 communicate with the network directly using an exclusive wired backhaul link 24 or an exclusive radio channel. In accordance with the principles of the present invention, a base station ("BS") 16 may connect to the network though another BS which has network connection, using a relay station ("RS") 22 as an intermediate node. This connection can be implemented when the network access is lost due to a disaster or emergency situation. The BS 16 which lost connection searches for relays 22 which are already connected to other BSs and then establishes connection with those other base stations using an emergency identifier. The services provided by the attached BS 16 may be only limited operation. The RS 22 should be able to listen to both BSs 16, providing a quick way to re-establish communication when the full network links are down in an emergency situation. Emergency relief teams can go the area and give one BS the network connection using special means, e.g. microwave, and place special relay stations 22 in the cell boundaries of the adjacent BSs 16, thus expanding the network. Far away BSs 16 may be connected as a chain of BSs by simply placing the relay 22 in between. Although full service may not be available, embodiments of the present invention provide a quick way to fix the backhaul problem, co-ordinate Radio Resource Management ("RRM"), or allow for temporary installation of BSs for special needs. Additionally, embodiments of the present invention allow a group of BSs to independently provide service to a local area, even without the network connection.

During emergency operation, the BS may operate in an alternative network access mode or in a stand-alone mode. In the alternative network access mode, when a BS is disconnected from the network for some reason, it would identify its emergency services and try to establish network connection via available relays which has a connection to the network. The BSs connected to the network could be overloaded if all traffic is redirected. Therefore, the allowed emergency services would depend on the available resources. Some examples are text messages, short conversations, 911 operation, etc. In the stand-alone mode, if another wireless system with network access is not available, the BS may connect with other BSs, forming a larger network and continuing to provide the services local to its coverage area. In this way, the mobiles within this connected BS network could communicate and have a better idea of the situation.

Figures 12, 13:
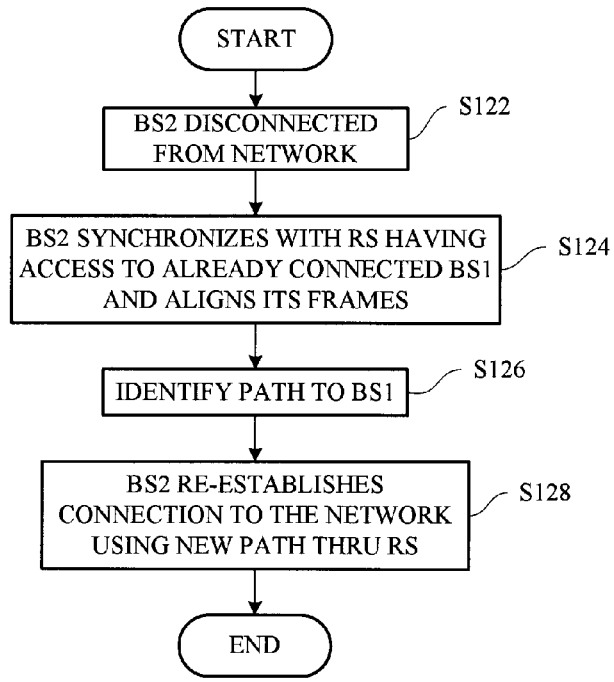
FIG. 12 is a flow chart of an exemplary disaster recovery process according to the principles of the present invention.
FIG. 13 is table illustrating exemplary relay frame structure options for out-of-band signals in accordance with the principles of the present invention.

Referring now to FIG. 12, an exemplary operational flowchart is provided which describes steps for a BS 16 to operate in an alternative network access mode. To establish BS-BS RRM co-ordination and transmission of urgent message between BSs using relays, assume a relay (RS0) is connected to two base stations, BS1 (master BS) which already established sync and BS2 (slave BS) which has not established sync or lost sync. Also assume that repeated attempts to reestablish synch via its normal routes, e.g., via backhaul, have failed, for example, due to a disaster situation. BS2 is disconnected from the network (step S122), e.g., failure of the backhaul, BSC, etc. BS2 sends a request to associated relays inquiring whether those relays have a path established to the network. If they do, the BS2 synchronizes to that relay's frame structure and aligns its frames (step S124).

To establish BS-BS synchronization, RS0 transmits the frame-start preamble usually sent by the BS in its DL exactly at the same time as the BSs. Because RS0 is already connected to BS1, it can establish sync by listening to downlink preamble. Uplink sync may be achieved by adjusting the uplink ranging signal timing according to time adjustments suggested by BS1, then by calculating the accumulated time adjustment signals, the RS can assess the round trip delay ("RTD") and adjust its own DL transmission frame (including its frame-start signal) by RTD/2 to get an exact synchronization with the BSs DL transmission. Similarly, BS2 can then synchronize to the RS0 transmission. In this case, the BS has extra DL receiver hardware to detect the DL preamble and an extra UL ranging signal transmitter.

Alternatively, the slave BS (BS2) may acquire sync based on a special preamble send by the relay 22 over the UL. BS2 listens to the preamble and syncs to the R-Preamble sent by the relay 22 in the uplink, identifies it as being sent from a specific location and starts sending its own R-preamble. Each RS 22 has its own monitoring slot for other R-preambles. RS0 listens to the BS's R-preamble and estimate the RTD by evaluating the time difference. This delay amount is sent back to BS2 and BS2 advances its frames by RTD/2. As above, extra DL receiver hardware is needed, but an R-Preamble transmitter is usually available for relay operation.

In another alternative embodiment, BS2 may also send a UL ranging signal with the correct offset instead of the R-preamble. This method may be more accurate as the UL ranging signal may provide precise sync information. Extra DL receiver hardware and a UL ranging transmitter are needed.

Returning to FIG. 12, after BS2 has regained sync, the path to the BS1 identified (step S126) and connection to the network is re-established with the new path (step S128). This connection may be done in two ways. BS2 may act as a relay to the new network or BS2 may act as an independent BS connected via the new path, e.g., using tunneling protocol.

BS2 sends exclusive messages to be forwarded to BS1. The relay 22 receives the data from BS2 in the downlink ("DL") and forwards the data using the uplink ("UL") in the next frame. This is in contrast to normal relay operation where the relay 22 receives from the BS DL and forwards it via relay DL to another relay or MS 20. This means the relay 22 has to wait until the next RS-BS UL to forward this data to BS1.

Even after the connection is established, BS2 continuously searches for other connected networks that may be connected via relays. If an additional network is found via another relay, BS2 requests the number of hops it takes to the connected BS in that network and if that is smaller than the current network, it would switch to the new network. New sync may be needed.

Since it takes time to propagate the information regarding the availability of a connected network after a disaster, several regular attempts should be made so that a BS further away could establish connection. If it cannot find a connection to such a network within a certain time, the BS goes to stand-alone mode. While in the stand-alone mode, BS2 still tries to search for access to connected networks on a regular basis.

Multi-Carrier Relay Operation

An embodiment of the present invention change the frame structure such that receiving information at the relay station from BS using f1 and transmission to its subordinate relay station using f2 may be performed simultaneously, thereby saving resources. If the frequencies are far apart, the added complexity is negligible and this process may be implemented using a simple duplexer. However, if f1 and f2 are located in closer bands, some special isolation circuits may need to be used. A frame structure constructed in accordance with the principles of the present invention allows for both situations.

The frame structure of the relay 22 is organized such that transmission zones to subordinate RSs and receiving zones from super-ordinate RSs overlap. This aspect allows the usage of a complete relay zone for two purposes simultaneously without causing any interference with some minor enhancements in the duplexer and filters.

FIG. 13 provides a table 150 illustrating frequency designations for a variety of situations. For example, in option A 152, the relay link/backhaul may be a wireline or non-802.16e compliant wireless link, e.g., microwave, Wi-Fi, etc. In option B 154, the relay link and the access link may use different 802.16e carriers and there is sufficient isolation to have no interference among these carriers. In option C 156, the relay link may use an adjacent or close carrier frequency and a simultaneous receive and transmit from the relay station 22 is not possible. Finally, in option D 158, the relay link/backhaul may be wireless and use the same carrier for the relay and access links, e.g., in-band relay, current 802.16j. It should be noted that for situations B1 160 and C1 162, MS 20 uses the same carrier when moving from BS 16 to RS 22. RS 22 and BS 16 use two carriers to transmit. For situations B2 164 and C2 166, the same carrier is used for BS-MS and BS-RS links while RS 22 uses two carriers for access and relay links. MS 20 has to switch carriers when moving from BS 16 to RS 22.

Figure 14:
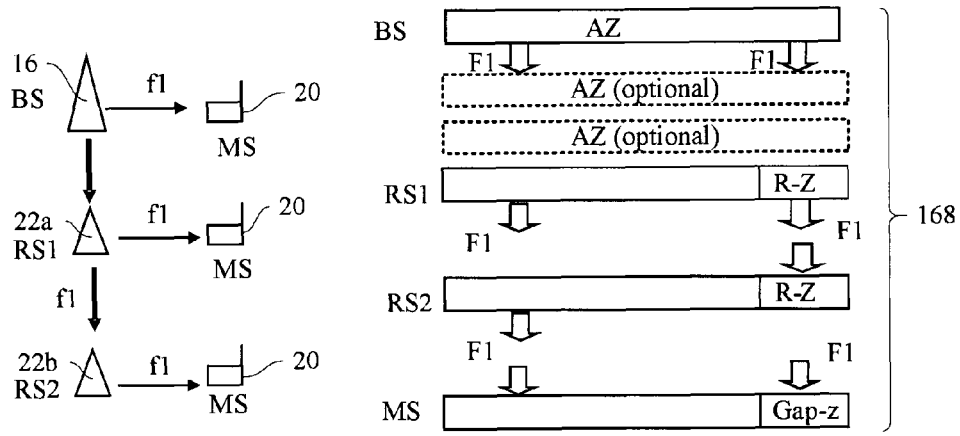
FIG. 14 is an exemplary frame structure for a wireline or non-16e relay link according to the principles of the present invention.

Referring now to FIG. 14, option A 152 is depicted where the relay link/backhaul is a wireline or non-802.16e compliant wireless link. In this case, the RS frame structure 168 agrees with 802.16j, but the frame structure 168 may also be applied in use with non-802.16e relay links.

Figure 15:
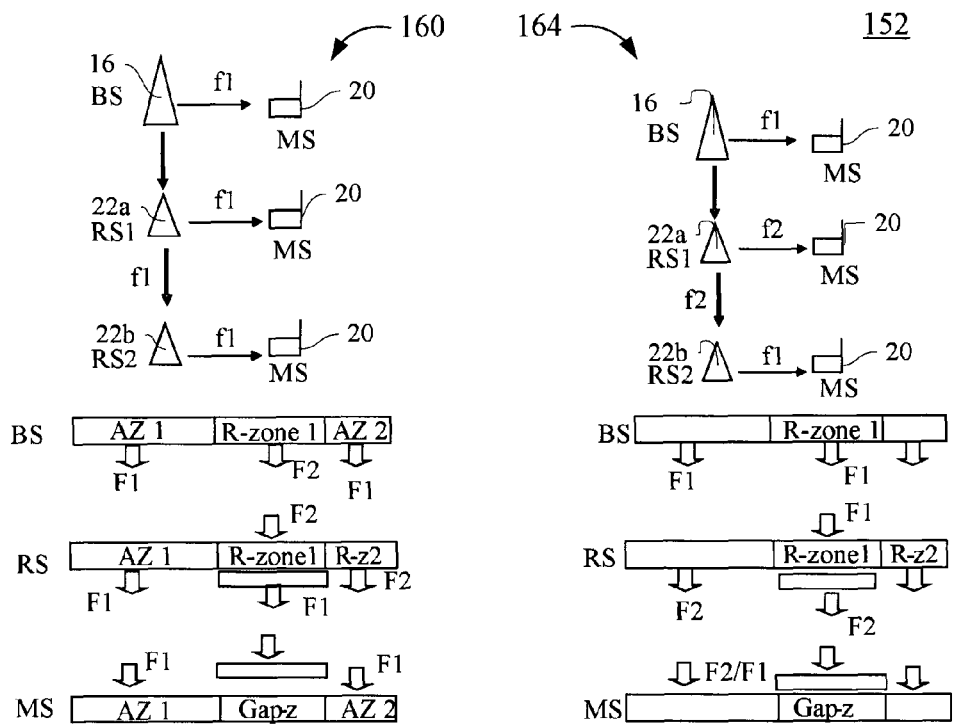
FIG. 15 illustrates exemplary frame structures for interfering carriers for a relay link and access links with a single radio according to the principles of the present invention.

In FIG. 15, option B 154 is depicted, with scenario B1 160 on the left and scenario B2 164 on the right, where there are non-interfering carriers for the relay link. It should be noted that in the scenario depicted in FIG. 15, the relay station 22 includes a single radio. Because the carriers do not interfere, the RS 22 can receive in one frequency while transmitting on the other. This implementation requires changes to the 802.16j frame structure as well as additional RS 22 equipment, e.g., a duplexer. Option C 156, where there are interfering carriers for the relay link, e.g., carriers having frequencies close together, cannot be implemented in this manner using a relay station 22 with a single radio.

Figure 16:
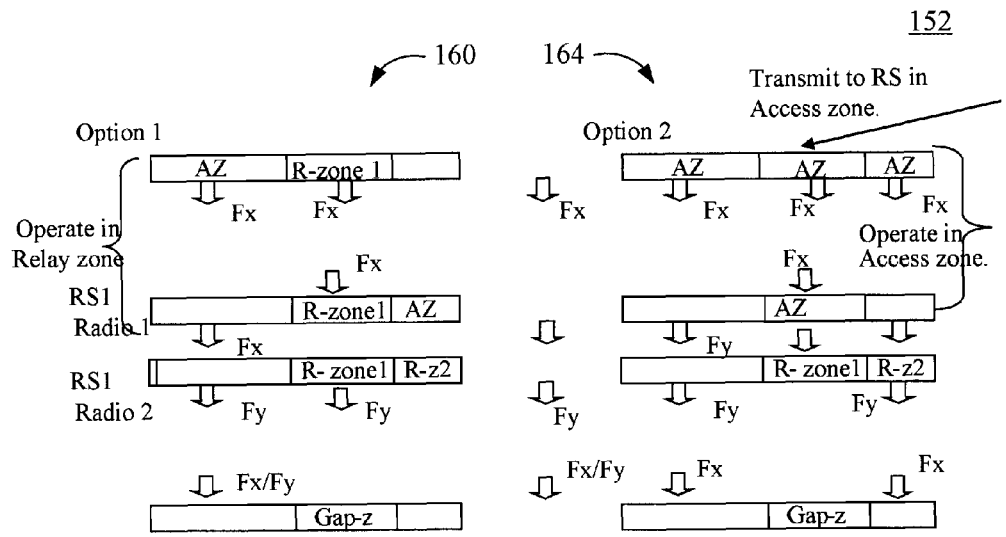
FIG. 16 illustrates exemplary frame structures for wireless relay link having a non-interfering carrier with a two radios according to the principles of the present invention.

FIG. 16 also depicts option B 154, except RS 22 includes two radios. In scenario B1 160, a standard 802.16j MR-BS link may be used as both radios follow the 802.16j standard for relay stations. For scenario B2 164, if radio 1 is operated in an access zone, i.e. MS mode, to communicate with the BS, the Fy carrier operation is like 802.16j, but the Fx operation is performed as 802.16e.

Figure 17:
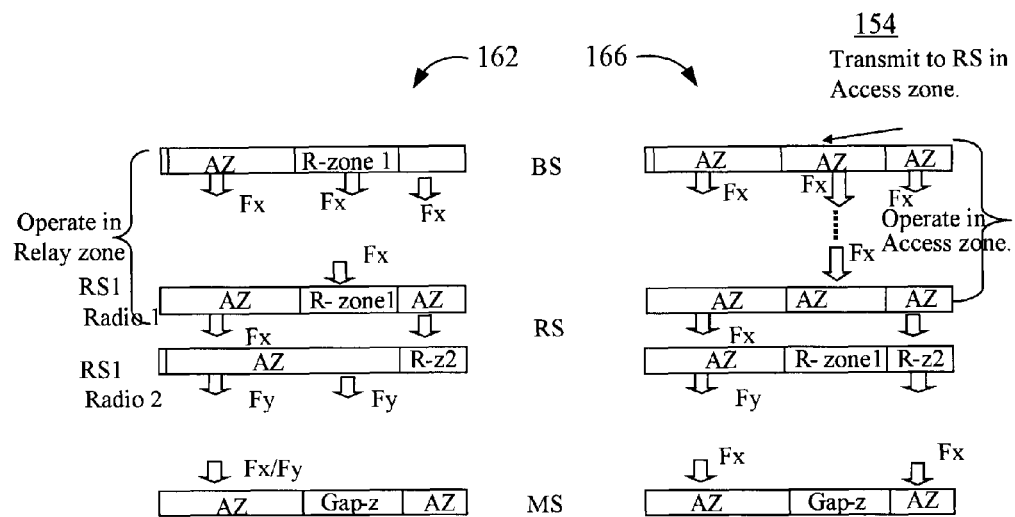
FIG. 17 illustrates alternative frame structures for wireless relay link having a non-interfering carrier with a two radios according to the principles of the present invention.

FIG. 17 illustrates the frame structure for option C 156, with scenario C1 162 on the left and C2 166 on the right, where the relay station 22 includes two radios. Because the two carriers are interfering, special isolation circuits may need to be used to prevent interference. As with option B 154, if radio 1 is operated in an access zone, i.e. MS mode, to communicate with the BS, the Fy carrier operation is like 802.16j, but the Fx operation is performed as 802.16e.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The invention claimed is:

1. A relay station for use in a wireless communication system, the relay station comprising:
   a transceiver operable to transmit wireless signals to and receive wireless signals from a first base station, a second base station, and at least one mobile station of the wireless communication system, the wireless signals transmitted to the first base station and the second base including a single preamble, MAP and FCH;
   a controller electrically connected to the transceiver, the controller operable to measure a signal quality of the mobile station, the mobile station communicatively connected to the first base station; and
   relay circuitry electrically connected to the controller, the relay circuitry operable to conduct a phased handoff of the mobile station from the first base station to the second base station based on the signal quality, wherein the phased handoff comprises performing a first intra-base station handoff between the first base station and the relay station, wherein the first intra-base station handoff being performed is responsive to determining that the signal quality of the mobile station is greater along a first path including the relay station and the first base station than the signal quality of the mobile station along a second path directly to the first base station;
   wherein the wireless communication system comprises a plurality of base stations communicatively coupled to a backhaul network and the mobile station, and wherein the relay station is shared by at least the first base station and the second base station.

2. The relay station of claim 1, wherein the phased handoff is conducted based on a relative signal quality and/or a speed of the mobile station.

3. The relay station of claim 1, wherein the phased handoff comprises:
   performing a partial handoff from the first base station to the second base station, the partial handoff maintaining a connection between the relay station and the mobile station; and
   performing a second intra-base station handoff between the relay station and the second base station.

4. The relay station of claim 3, wherein the partial handoff being performed is responsive to determining that the signal quality of the mobile station is greater along a third path including the relay station and the second base station than the signal quality of the mobile station along the first path; and the second intra-base station handoff being performed is responsive to determining that the signal quality of the mobile station is greater along a fourth path directly to the second base station than the signal quality of the mobile station along the third path.

5. The relay station of claim 3, wherein the communication system further includes a group of subordinate relay stations, the transceiver is further operable to transmit wireless signals to and receive wireless signals from the group of subordinate relay stations, and the phased handoff further comprises performing at least one partial handoff between subordinate relay stations of the group of subordinate relay stations.

6. The relay station of claim 1, wherein responsive to the first base station becoming disconnected from the network, the relay circuitry is further operable to communicatively connect the first base station to the second base station as an intermediate node.

7. The relay station of claim 6, wherein the second base station remains connected to the backhaul network, the relay station operates in a network access mode wherein the first base station has limited functionality.

8. The relay station of claim 7, wherein: the transceiver is further operable to receive an emergency identifier from the first base station; and the relay circuitry is further operable to:
   establish sync with the first base station using one of a downlink preamble and a special uplink R-preamble; and
   connect the first base station to the network through the second base station.

9. The relay station of claim 8, wherein the transceiver is further operable to:
   receive data from the first base station in a downlink portion of a first frame; and
   forward the data to the second base station using an uplink portion of a next frame.

10. The relay station of claim 6, wherein the second base station is also disconnected from the network, the relay station operates in a stand-alone mode connecting the first base station to the second base station to form a local network.

11. A relay station for use in a wireless communication system, the relay station comprising:
   at least one transceiver operable to transmit signals to and receive signals from at least one base station and at least one communication device of the wireless communication system;
   at least two communication interfaces electrically connected to the at least one transceiver, each communication interface implementing a different communication protocol stack;
   an interface translator electrically connected to the at least two communication interfaces, the interface translator operable to translate information between the communication interfaces from a first protocol stack associated with a first one of the communication interfaces to a second protocol stack associated with a second one of the communication interfaces; and
   relay circuitry electrically connected to the at least one transceiver, the relay circuitry operable to:
      relay signals between the base station and the communication device; and conduct a phased handoff of the communication device from the base station to another base station based on a signal quality wherein the phased handoff comprises performing a first intra-base station handoff between the base station and the relay station, wherein the first intra-base station handoff being performed is responsive to determining that a signal quality of the communication device is greater along a first path including the relay station and the base station than the signal quality of the communication device along a second path directly to the first base station.

12. The relay station of claim 11, wherein the first protocol stack is 802.16 and the second protocol stack is one of 802.11 and 802.15.

13. The relay station of claim 11, wherein a wireless tunnel is communicatively coupled between the base station and the relay station, the wireless tunnel forwarding data between the base station and the relay station on a data link layer basis.

14. The relay station of claim 13, wherein the wireless tunnel operates using Relay Media Access Control.

15. The relay station of claim 13, wherein the wireless tunnel extracts quality of service information from an upper layer header associated with the data link layer and carries the quality of service information and tunnel information on a tunnel packet.

16. A relay station for use in a wireless communication system, the relay station comprising:
  relay circuitry operable to:
    relay wireless signals between a first base station and a communication device of the wireless communication system, and between the first base station and a relay station of the wireless communication system;
    conduct a phased handoff of the communication device from the first base station to a second base station based on a signal quality wherein the phased handoff comprises performing a first intra-base station handoff between the first base station and the relay station, wherein the first intra-base station handoff being performed is responsive to determining that a signal quality of the communication device is greater along a first path including the relay station and the first base station than a signal quality of the communication device along a second path directly to the first base station; and
  a first transceiver electrically connected to the relay circuitry, the first transceiver operable to simultaneously receive a first wireless signal from the base station using a first frequency and transmit a second wireless signal to the subordinate relay station using a second frequency.

17. The relay station of claim 16, wherein the wireless signals include a frame structure having a transmission zone to a subordinate relay station and a receiving zone from one of a base station and a superordinate relay station, the transmission zone and the receiving zone overlapping.

18. The relay station of claim 16, wherein the first frequency and the second frequency are non-interfering.

19. The relay station of claim 16, further comprising a duplexer electrically connected to the first transceiver, the duplexer operable to combine the first wireless signal and the second wireless signal.

20. The relay station of claim 16, wherein the first frequency and the second frequency are interfering, the relay station further comprising:
  a second transceiver, the second transceiver electrically connected to the relay circuitry, the second transceiver operable receive a first wireless signal from the base station using a first frequency and while the first transceiver transmits a second wireless signal to the subordinate relay station using a second frequency; and
  isolation circuitry connected between the first transceiver and the second transceiver, the isolation circuitry operable to isolate the first wireless signal from the second wireless signal.

* * * * *

UNITED STATES PATENT AND TRADEMARK OFFICE
CERTIFICATE OF CORRECTION

| | | |
|---|---|---|
| PATENT NO. | : 8,576,753 B2 | Page 1 of 1 |
| APPLICATION NO. | : 12/937476 | |
| DATED | : November 5, 2013 | |
| INVENTOR(S) | : Nimal Gamini Senarath et al. | |

It is certified that error appears in the above-identified patent and that said Letters Patent is hereby corrected as shown below:

On the Title Page

Item (73) Assignee: Delete "Apple, Inc." and substitute -- Apple Inc. --

Signed and Sealed this
Twenty-fourth Day of June, 2014

Michelle K. Lee
*Deputy Director of the United States Patent and Trademark Office*